(12) United States Patent
Savage, Jr. et al.

(10) Patent No.: US 8,845,136 B2
(45) Date of Patent: Sep. 30, 2014

(54) ADJUSTABLE STROBE REFLECTOR ASSEMBLY

(75) Inventors: Kenneth E. Savage, Jr., Fitchburg, MA (US); Steven T. Varieur, Winchendon, MA (US)

(73) Assignee: Tyco Fire & Security GmbH, Neuhausen am Rheinfall (CH)

( * ) Notice: Subject to any disclaimer, the term of this patent is extended or adjusted under 35 U.S.C. 154(b) by 432 days.

(21) Appl. No.: 12/749,928

(22) Filed: Mar. 30, 2010

(65) Prior Publication Data

US 2011/0242688 A1 Oct. 6, 2011

(51) Int. Cl.
| | |
|---|---|
| *F21V 14/08* | (2006.01) |
| *F21V 14/04* | (2006.01) |
| *G03B 15/06* | (2006.01) |
| *F21V 7/18* | (2006.01) |
| *F21V 7/00* | (2006.01) |
| *G02B 5/09* | (2006.01) |
| *F21V 17/02* | (2006.01) |

(52) U.S. Cl.
CPC . *G02B 5/09* (2013.01); *F21V 14/04* (2013.01); *G03B 15/06* (2013.01); *F21V 7/18* (2013.01); *F21V 7/0025* (2013.01); *F21V 17/02* (2013.01)
USPC .......... 362/279; 362/278; 362/319; 362/321; 362/322; 362/323; 362/324; 362/364; 362/348; 362/284

(58) Field of Classification Search
USPC ......... 362/278, 279, 280, 281, 282, 283, 284, 362/319, 321, 322, 323, 324, 297, 346, 348
See application file for complete search history.

(56) References Cited

U.S. PATENT DOCUMENTS

| | | | | |
|---|---|---|---|---|
| 3,628,852 | A * | 12/1971 | Snaper et al. | 359/849 |
| 3,699,576 | A * | 10/1972 | Hoyer | 342/10 |
| 3,798,441 | A * | 3/1974 | Wilson | 362/261 |
| 4,087,682 | A * | 5/1978 | Kolodziej | 362/297 |
| 4,251,819 | A * | 2/1981 | Vickland | 343/882 |
| 4,490,776 | A * | 12/1984 | Kluch | 362/16 |
| 4,872,098 | A * | 10/1989 | Romano | 362/283 |
| 5,198,832 | A * | 3/1993 | Higgins et al. | 343/915 |
| 5,287,259 | A * | 2/1994 | Lautzenheiser | 362/341 |
| 6,326,905 | B1 | 12/2001 | Walters | |
| 6,426,697 | B1 | 7/2002 | Capowski et al. | |
| 6,623,143 | B2 * | 9/2003 | Anderson | 362/297 |
| 7,063,428 | B2 * | 6/2006 | Lowe | 362/18 |
| 7,261,440 | B2 * | 8/2007 | Kwasny | 362/297 |
| 7,452,111 | B2 * | 11/2008 | Mazzei | 362/346 |
| 2007/0263279 | A1 | 11/2007 | Savage, Jr. et al. | |

* cited by examiner

*Primary Examiner* — Thomas Sember
*Assistant Examiner* — Tsion Tumebo
(74) *Attorney, Agent, or Firm* — Brinks Gilson & Lione (57) ABSTRACT

A strobe reflector that includes a reflective material and a support structure. The support structure may be adjusted or moved into at least two distinct positions to provide two distinct shapes for the reflective material. The first position of the support structure shapes the reflective material in a first configuration (such as a half-hemisphere) and a second position of the support structure shapes the reflective material in a second configuration (such as a full hemisphere).

22 Claims, 7 Drawing Sheets

ADJUSTABLE STROBE REFLECTOR ASSEMBLY

BACKGROUND

Fire alarm devices such as audible horns (audible/visible or A/V), loudspeakers (speaker/visible or S/V) and visible strobes (visible only or V/O), are referred to as "notification appliances." Typically, a fire alarm control panel (FACP) drives these devices over one or more "notification appliance circuits" (NACs). The strobes are required, for example, as an alert for the hearing-impaired, or for those in a high noise environment.

A strobe is typically made up of a high-intensity Xenon flash tube, an electronic control circuit, a terminal block to connect the device to the NAC, a housing, a strobe reflector assembly, and a transparent protective dome.

The strobe is a notification device designed to disperse its light output in a predetermined pattern. Further, the strobe is typically installed to a wall or ceiling of a building. Because of the different installations (whether to the wall or ceiling), the strobe should be tailored for the type of installation to ensure the proper predetermined pattern of light is output from the strobe. Thus, the strobe needs to be designed specifically so that, when installed to either the wall or to the ceiling, the strobe provides the required light output in the proper pattern. However, these specific designs increase the complexity of the strobe. Accordingly, a need exists for configuring a strobe for a variety of environments that is simpler in design.

SUMMARY

The present embodiments relate to an adjustable strobe reflector assembly for an alarm system notification device (such as a strobe device). The strobe reflector assembly may be included in a strobe device, which may further include a strobe, a controller, and a communication or network interface.

The strobe reflector assembly comprises a reflective material and a support structure. At least a part of the support structure may be adjusted or moved to at least two distinct positions, with a first position shaping the reflective material in a first configuration and a second position shaping the reflective material in a second configuration. For example, a first configuration for the reflector may be a half-hemisphere (or a semi-hemisphere), which may be used for a ceiling mount of the strobe device, and a second configuration for the reflector may be a full hemisphere, which may be used for a wall mount for the strobe device. In this way, a single strobe reflector assembly may be configured for different installations (whether to the wall or ceiling).

In one embodiment, a part of the support structure is movable (such as a first structure) and another part of the support structure (such as a second structure) is stationary. The first structure may be independently movable with respect to the second structure. The first structure may comprise a telescoping or accordion-type structure, movable between at least two separate and distinct positions. The first position (such as a retracted position) of the first structure arranges the strobe reflector in the first configuration and the second position (such as an extended position) arranges the strobe reflector in the first configuration. In the retracted position, part of the reflective material may be folded (such as folded underneath an outer surface of the reflective material facing the strobe). In the extended position, the reflective material may not be folded. The second structure may comprise a skeletal structure that is non-movable and affixed to the housing or the base of the strobe device. In a second embodiment, the entire support structure of the adjustable reflector is movable.

Other systems, methods, features and advantages will be, or will become, apparent to one with skill in the art upon examination of the following figures and detailed description. It is intended that all such additional systems, methods, features and advantages be included within this description, be within the scope of the invention, and be protected by the following claims.

DETAILED DESCRIPTION

Figure 1:
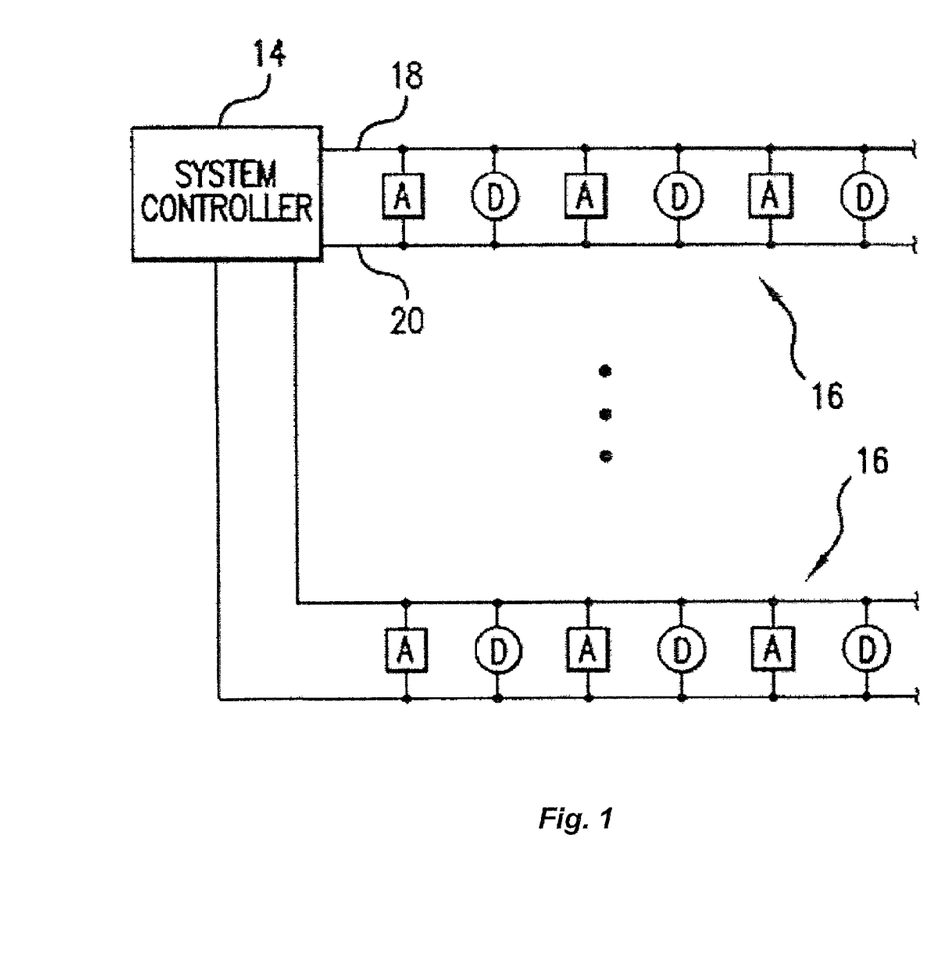
FIG. 1 is a schematic diagram illustrating a system embodying the present invention.

A system embodying one example of the present invention is illustrated in FIG. 1. The system includes one or more notification appliance circuits (NACs), i.e., networks 16, having alarm condition detectors D and alarm system notification devices A. Alternatively, the detectors and notification devices may be on separate networks. A system controller (such as a fire alarm control panel (FACP) 14) may monitor the detectors D. When an alarm condition is sensed, the fire alarm control panel 14 may signal the alarm to the appropriate notification devices through one or more networks 16. Notification devices may include, for example, a visual alarm (strobe), an audible alarm (horn), a speaker, or a combination thereof Although not necessary for carrying out the invention, as shown, all of the notification devices in a network are coupled across a pair of power lines 18 and 20 that advantageously also carry communications between the fire alarm control panel 14 and the detectors D and notification devices A.

The notification devices A may be remotely programmed using the fire alarm control panel 14. In particular, the fire alarm control panel 14 may use one or more of the following: software configuration tools; fire alarm panel displays and keypads or similar user interfaces; service port command; external computer interfaces; Internet interfaces; and modem or other remote connection interfaces.

Commands from the fire alarm panel can, for example, be multiplexed onto the device's power line, providing the added benefit that it saves the cost of additional wiring to devices. See for example, U.S. Pat. No. 6,426,697, incorporated by reference herein in its entirety. Alternatively, the communication line to the device may be separate from the power line. The communications channel may comprise, for example, a wireless link, a wired link or a fiber optic link.

As another example, the notification devices A may be locally programmed. Specifically, the notification device A may be programmed manually (without its removal) via any of a variety of means, including but not limited to: configuring a switch on the notification device A, jumpers, optical signaling (e.g. TV remote control, blinking flashlight, light bulb or other light source, laser pointers, breaking optical beam), a magnet tapped against the device, radio frequency (RF) tags, sound signaling (e.g. ultrasonic tones, touchtones) etc.

Communication signals to and from the fire alarm control panel 14 may be multiplexed onto the device's power line, or may be on a communication line that is separate from the power line. Alternatively, a fiber optic cable link or a wireless connection can be utilized. Alternatively, or in addition, the notification device A may directly communicate with the fire alarm control panel 14 using for example, optical signaling (for example, an LED, an infrared emitter, etc.). The notification device A may also communicate using other means, such as RF tag reading or audio (e.g., ultrasonic, chirps, beeps, prerecorded or synthesized voice, etc.)

One, some, or all of the notification devices A may comprise a strobe device. As discussed in more detail below, the strobe device may be configured to operate in a variety of environments, such as mounted to a wall or to a ceiling.

Figure 2:
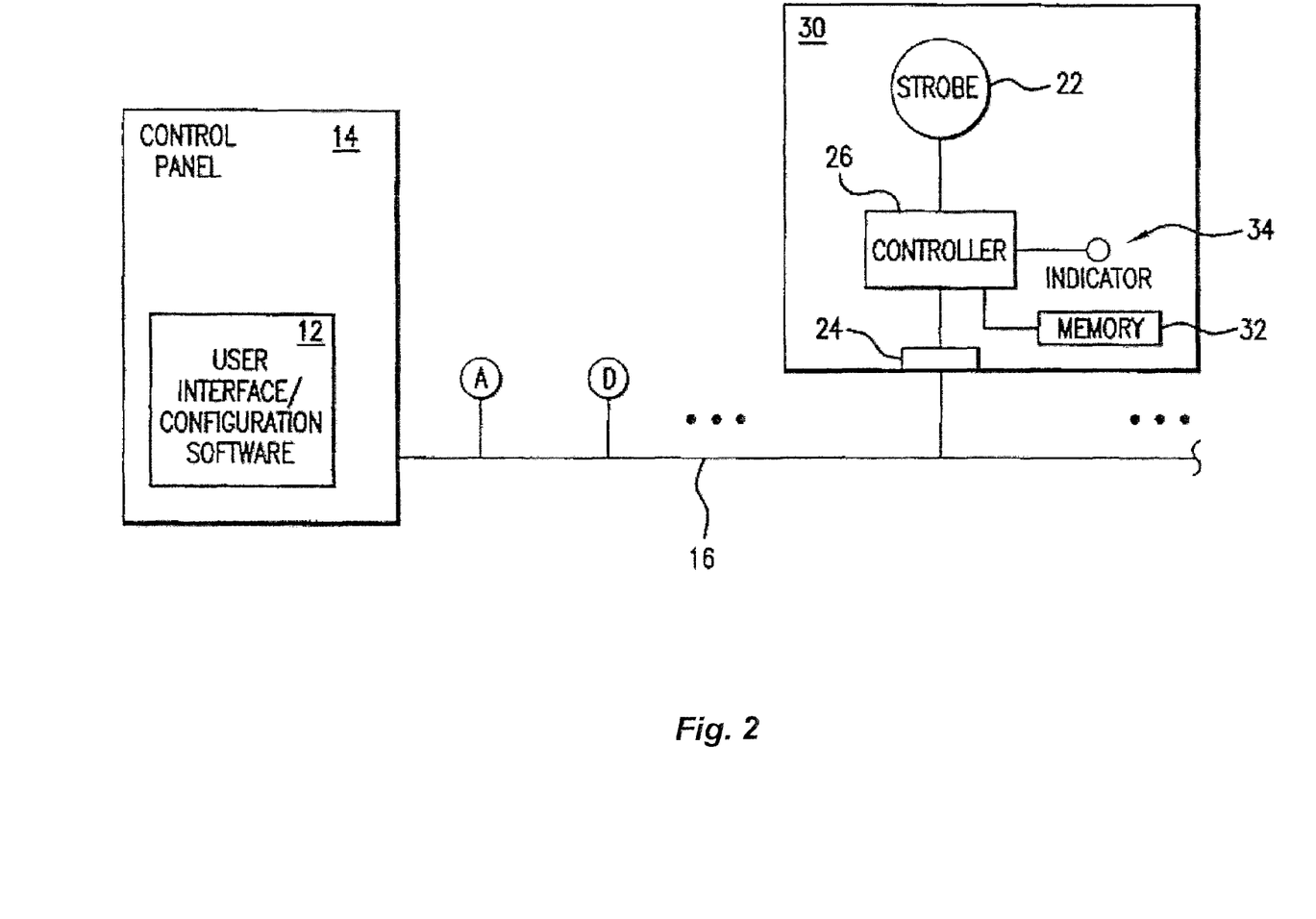
FIG. 2 is a schematic diagram of the system of FIG. 1, further illustrating details of an embodiment of the present invention.

FIG. 2 is a schematic diagram of the system of FIG. 1, further illustrating details of an embodiment of the present invention. For simplicity, the two-line network of FIG. 1 is shown with a single line 16. The fire alarm control panel 14 includes a user interface and configuration software 12 which allow a user to program the individual strobe devices 30 on the network or communications channel 16.

Figure 3A:
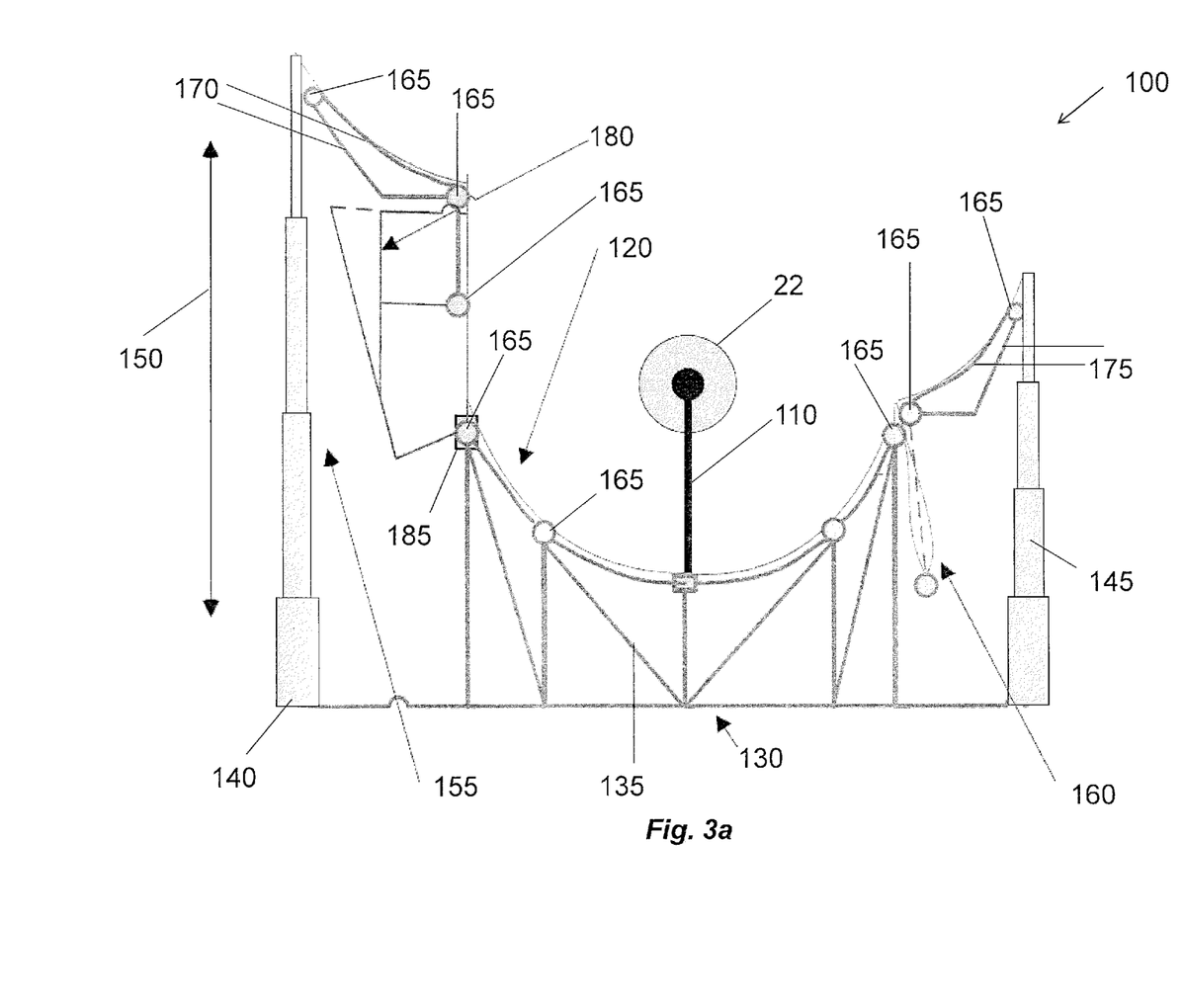
FIG. 3a is an end view of one example of the strobe device along cross-section A-A in FIG. 4 with one of the retractable sections extended and one of the retractable sections retracted.
Figure 3B:
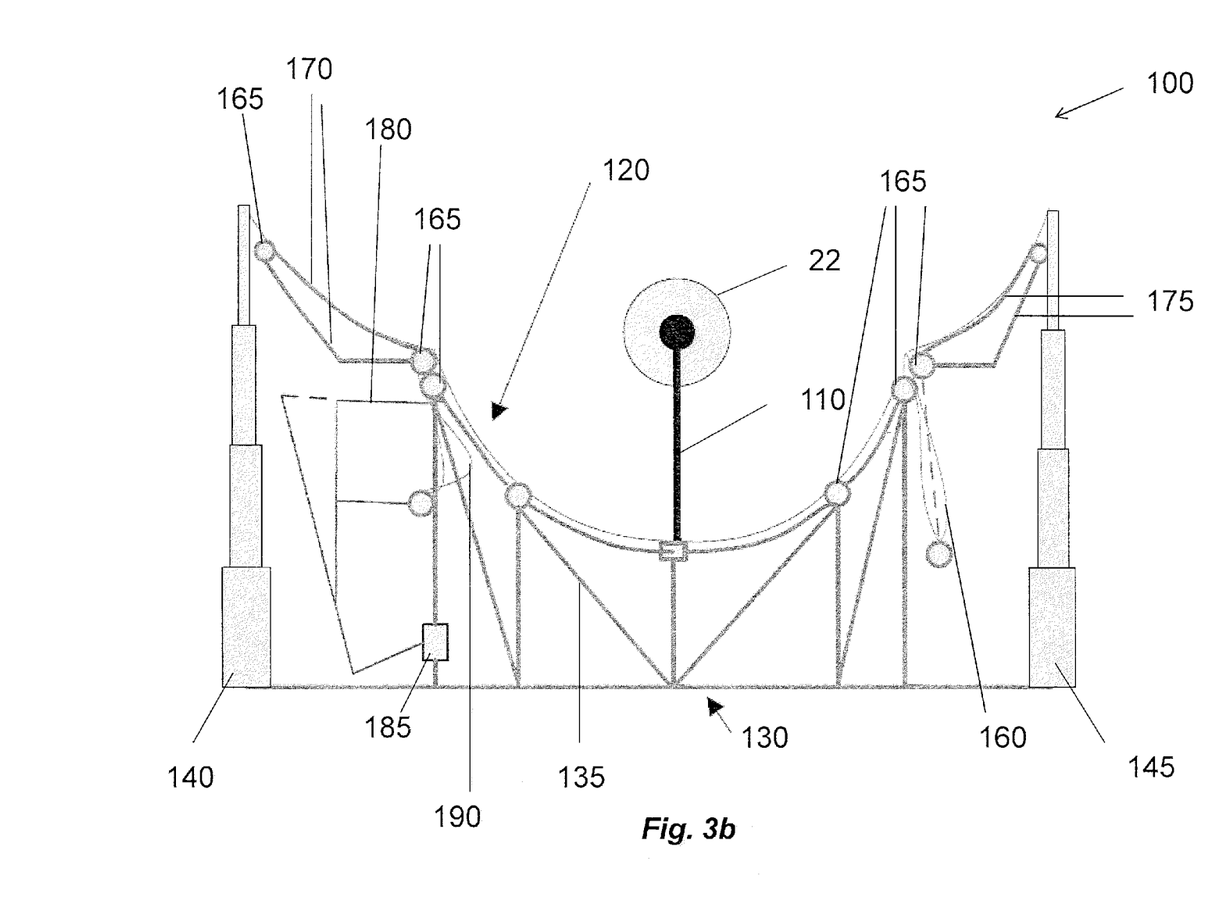
FIG. 3b is an end view of one example of the strobe device along cross-section A-A in FIG. 4 with both of the retractable sections retracted.
Figure 4:
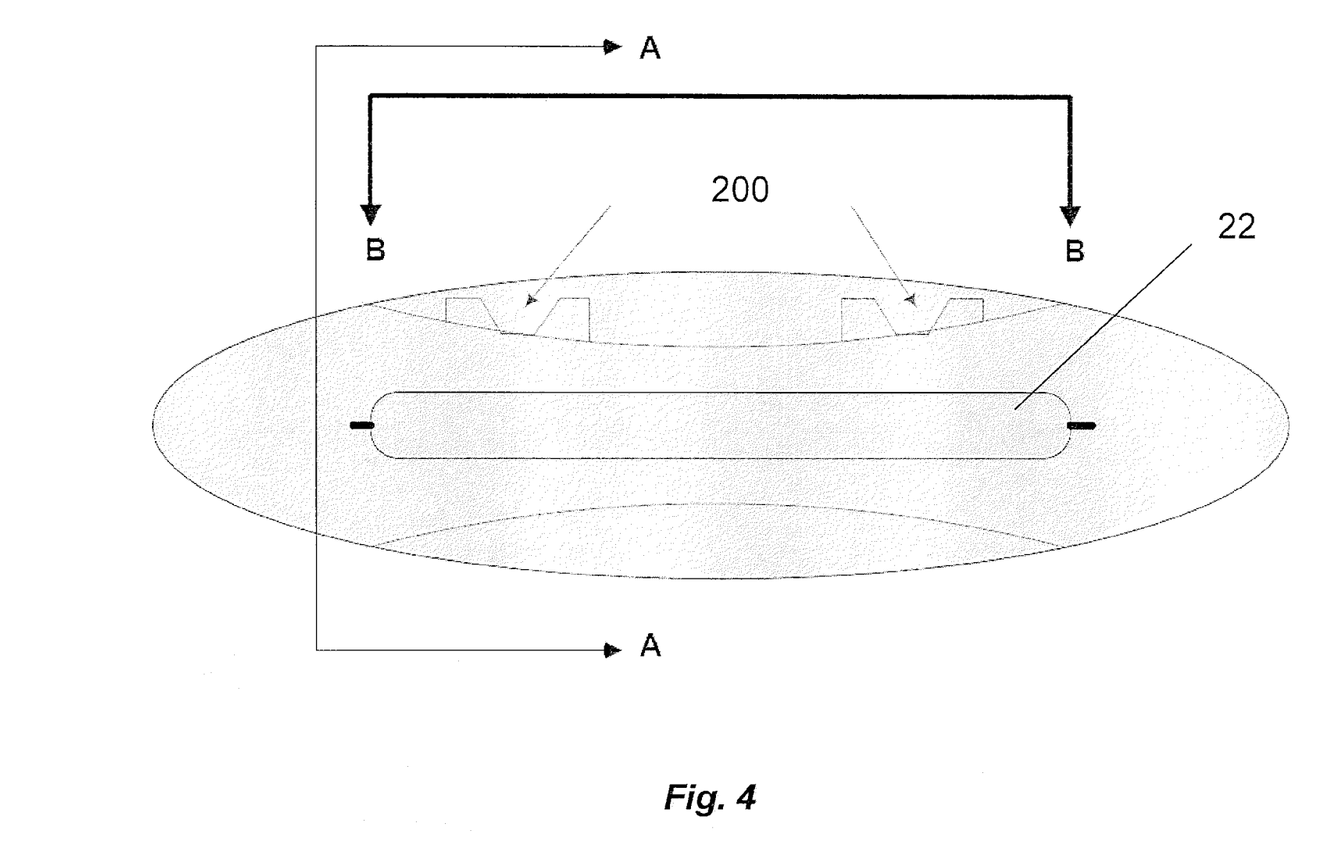
FIG. 4 is a top view of the strobe device illustrated FIG. 1.
Figure 5:
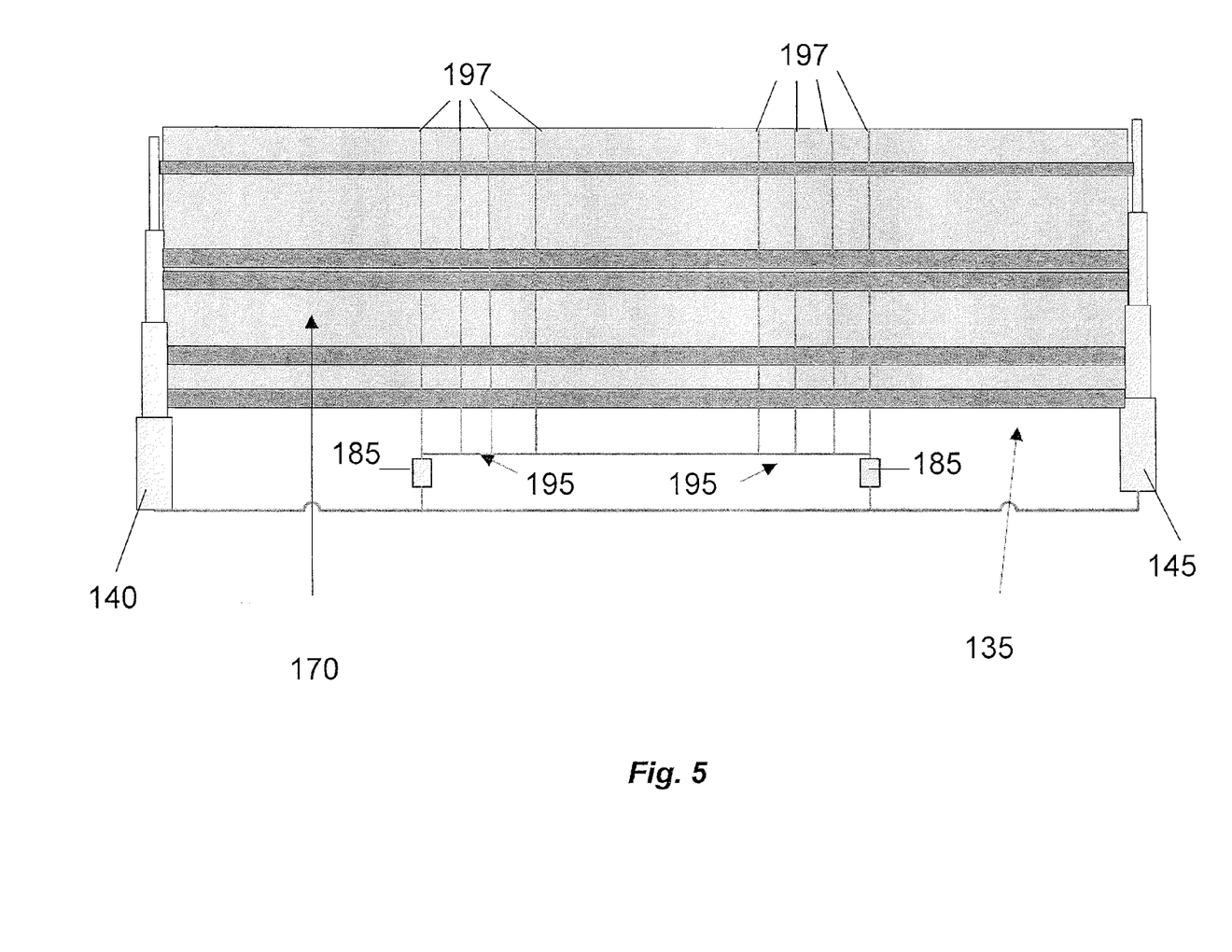
FIG. 5 is a side cross-sectional view B-B' illustrated in FIG. 4 with both telescoping structures in the retracted position.

Strobe device 30 comprises a network interface 24, a controller 26, a strobe 22, a memory 32, an indicator 34, and a reflector assembly (not shown in FIG. 2, depicted in FIGS. 3-5). The strobe device 30 connects to the network 16 via the network interface (communication connection) 24. The controller 26, such as a microcontroller or hardwired logic, receives commands from and sends data to the fire alarm control panel 14. For example, the fire alarm control panel 14 may send a command to activate the strobe 22 of the strobe device 30. When the strobe device 30 receives the command to activate the strobe 22, the strobe 22 flashes. The strobe 22 may comprise a Xenon flash tube or an LED and drive circuitry. Although shown separately, the memory 32 may be integrated with the controller 26. The indicator 34, such as a flashing LED, may indicate a current configuration of the strobe device 30, for example, upon command from the fire alarm control panel 14, upon a local manual command such as a pushbutton (not shown), on a periodic basis, always, or upon some other event.

FIG. 3a is an end view of one example of the strobe reflector assembly 100, the strobe 22, and the strobe support 110 along A-A' illustrated in FIG. 4. The strobe reflector assembly 100 comprises a reflector 120 and support structure 130. The reflector 120 may comprise a flexible and/or reflective material, such as biaxially-oriented polyethylene terephthalate (boPET) (commonly known under the trade name Mylar®), or other polyethylene material. The reflective material may comprise a material with high tensile strength, dimensional stability, and reflectivity.

As shown in FIG. 3a, the reflector 120 is supported by the support structure 130. In one embodiment, part of the support structure 130 may be stationary and part of the support structure 130 may be movable. In particular, support structure as depicted in FIG. 3a includes a skeletal structure (including stationary skeletal structure 135, first movable skeletal structure 170, and second movable skeletal structure 175) and telescoping structures 140, 145.

The stationary skeletal structure 135 is stationary or non-movable, and may be connected to the base or housing (not shown) of the strobe device 30. The stationary skeletal structure 135 or other type of supporting structure may distribute loads by placing strong structural members at strategic points in the strobe reflector assembly 100. The stationary skeletal structure 135 may be composed of one or more molded pieces of plastic. The stationary skeletal structure 135 may further be composed of carbon fiber, metal, or other rigid material. And, the end portions of the support structure 130 are movable, as shown in FIG. 3a. One example of a movable support structure 130 comprises first telescoping structure 140 and first movable skeletal structure 170, and second telescoping structure 145 and second movable skeletal structure 175, as shown in FIG. 3a. Similar to stationary skeletal structure 135, first movable skeletal structure 170 and second movable skeletal structure 175 may be composed of one or more molded pieces of plastic.

The telescoping structures 140, 145 in combination with the movable skeletal structures 170, 175 enable movement of one or more parts of the support structure 130. Specifically, the telescoping structure 140, 145 may be slid outward, thereby lengthening the support structure 130. Telescoping structure 140 is illustrated in FIG. 3a as extended (as shown by the arrows 150, 155 in FIG. 3a). Telescoping structure 140 likewise can be retracted. Telescoping structure 145 is illustrated in FIG. 3a as retracted. Likewise, telescoping structure 145 may be extended. In the retracted position, part of the reflective material may be folded (such as folded underneath an outer surface of the reflective material facing the strobe 22 as shown by the extra reflective material 160). FIG. 3a illustrates two telescoping structures. In another embodiment, one or more telescoping structures may be used.

The movable part of the support structure 130 may move independently of another part of the support structure, as illustrated in FIG. 3a. As one example, telescoping structure 140 and first movable skeletal structure 170 may move independently of the stationary skeletal structure 135, and independently of telescoping structure 145 and second movable skeletal structure 175. In particular, telescoping structure 140 may be extended without appreciable movement in the skeletal structure 135. Similarly, telescoping structure 140 may be extended without appreciable movement in telescoping structure 145. In this way, the movable part of the support structure 130 may move independently of the stationary part of the support structure 130 and/or independently of another movable portion of the support structure 130. This independent movement enables a variety of configurations of the reflector 120.

Because the reflector assembly is movable into multiple positions, the reflector 120 of the strobe reflector assembly 100 can be configured into multiple shapes. For example, the reflector 120 of the strobe reflector assembly 100 may be configured into at least two different configurations. A first configuration for the reflector may be a half-hemisphere (or a semi-hemisphere), which may be used for a ceiling mount of the strobe device 30. A second configuration for the reflector may be a full hemisphere, which may be used for a wall mount for the strobe device 30. Moreover, other configurations are possible.

One method by which to keep telescoping structure 140 and/or telescoping structure 145 in a predetermined positions (such as fully extended, fully retracted, or a position in between) is via an interference fit. An interference fit, also known as a press fit or friction fit, is a fastening between two parts which is achieved by friction after the parts are pushed together. An interference fit may be achieved by shaping two mating parts telescoping structure 140 and/or telescoping structure 145 so that one or the other (or both) slightly deviate in size from the nominal dimension. Alternatively, a slight bump or ridge at one or more positions along a shaft of telescoping structure 140 and/or telescoping structure 145 may be used to help lock the position telescoping structure 140 and/or telescoping structure 145 via additional interference.

FIG. 3a depicts that the reflector 120 comprises a single continuous sheet of reflective material. Alternatively, the reflector 120 may comprise multiple sheets or pieces of reflective material attached to various portions of the support structure 130. For example, a first piece of reflective material may be attached to the stationary skeletal structure 135, a second piece of reflective material may be attached to first movable skeletal structure 170, and a third piece of reflective material may be attached to second movable skeletal structure 175.

Another example of a movable support structure 130 comprises a sliding mechanism. Similar to an upside-down roman shade, the reflective material may fold accordion-style in a retracted configuration so that the folds are proximate to the base of the strobe device 130. The reflective material may be raised using cords, thereby extending the reflective material. In this way, the sliding mechanism may extend the folds of the reflective to a fully extended configuration.

The reflective material may be attached to the support structure 130 in one or more ways. For example, the reflective material may be attached to the support structure chemically, such as by gluing the reflective material to one or more connection points 165 of the support structure 130. As another example, the reflective material may be attached to the support structure mechanically, such as by using clips or pressure fittings at the one or more connection points 165 to affix the reflective material to the support structure 130. Or, the reflective material may be attached to the support structure in both a chemical and a mechanical manner. The strength of the attachment of the reflective material may be sufficient such that when the support structure 130 is moved (e.g., when the telescoping structure 140 is moved), the reflective material remains attached to the support structure 130.

The reflective material may reflect the light in one of a multitude of directions. One structure that may direct the light may comprise a light control surface, such as a facet 200 (also depicted in FIG. 4). The facet 200 may be raised or lowered. For example, FIG. 3a depicts that the facet 200 visible, with facet shape support 180 in the extended position. For example, the facets 200 may only be visible when the adjustable section (such as telescoping structure 140 being extended as depicted in FIG. 3a) is raised to redirect the light pattern. To hold or maintain the facet shape support 180 in the extended position, a friction slide 185 may be slid upward.

FIG. 3b is an end view of one example of the strobe device along cross-section A-A in FIG. 4 with both of the retractable sections retracted. FIG. 3b further shows the facet shape support 180 in the retracted position. The friction slide 185 is slid downward, as shown in FIG. 3b. Excess reflective material 190 may be tucked down, folded or pleated. In this way, the excess reflective material 190 when the strobe device is in the retracted position is not visible to the strobe 22 and does not reflect light from the strobe 22. Further, in the configuration as depicted in FIG. 3b, the facets 200 are also hidden from view.

FIG. 4 is a top view of the strobe device illustrated in FIG. 1 with telescoping structure 140 extended and telescoping structure 145 retracted. FIG. 4 illustrates strobe 22 as horizontal and the reflector 120 as generally oval in shape. The light source or element may comprise a strobe as shown, a flash tube in a different position or with a different shape, a single LED, or an array of LEDs. FIG. 4 further illustrates facets 200. The facets 200 may be visible when one of the telescoping structures 140, 145 are extended. Further, the facets 200 may comprise one or more types of patterns and may be used to direct the light, such as capturing the light and directing it in a predetermined direction (such as directing the light toward the floor).

Further, the facets may move upward and/or downward in order to configure the strobe device. In a retracted position, the facets 200 may be tucked down, folded or pleated, as shown in FIG. 3b. Further, in the retracted position, the reflective material may be tucked or folded underneath so that the excess reflective material is not viewed from the perspective of the strobe 22. The facets 200 may further be configured in the extended position, as shown in FIG. 3a. Further, the excess reflective material (tucked underneath when the facets are retracted) may be stretched across the facets in the extended position. In this way, the reflective material may bend to cover the shape of the facets 200. After configuring the strobe device, the facets 200 may be stationary.

FIG. 5 is a side cross-sectional view B-B illustrated in FIG. 4 with both telescoping structure 140 and telescoping structure 145 retracted. FIG. 5 further illustrates the skeletal structure 135, including the skeletal cross support, and the movable skeletal structure 170. Further, FIG. 5 illustrates the facets 200 in the retracted position. The facets 200 include facet structure support 195. As illustrated, facet structure support 195 comprises a table-like structure that supports the facets 200. Alternative types of supports for the facets are envisioned, including telescoping structures, such as telescoping structures 140, 145. The facet structure support 195 may be moved along one or more tracks, such as tracks 197. Further, the facet structure support 195 may be held in a stationary position via one or more friction slides 185.

Figure 6:
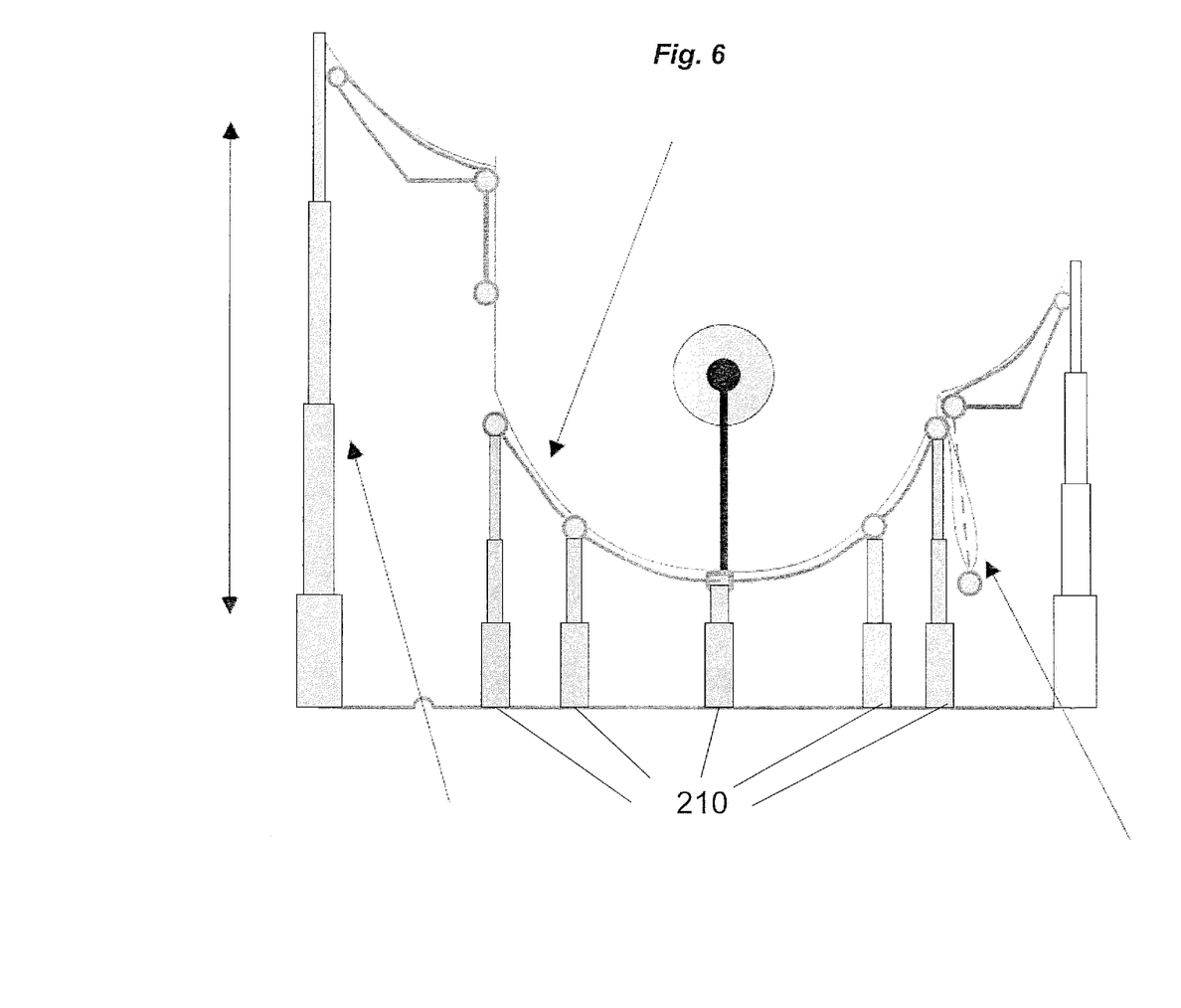
FIG. 6 is an end view of another example of the strobe device illustrated FIG. 1.

In an alternate embodiment, the entire support structure 130 may be movable. An example of this is depicted in FIG. 6, which illustrates additional telescoping structures 210. Thus, instead of stationary skeletal structure 135, additional telescoping structures 210 may move the central section of the support structure 130 upward/downward.

The support structure 130 may be moved manually, such as upon installation of the strobe device. Alternatively, the support structure 130 may be moved automatically. For example, one or more motors may provide the motive force in which to move one or all of telescoping structure 140 and telescoping structure 145. Further, the strobe device 30 may comprise one or more sensors (such as positions sensors, not shown) in which to sense a current configuration of the strobe reflector 100. The one or more sensors may also be used to relate position for a manually adjusted reflector to confirm proper reflector setting for a strobe device.

The strobe device 30 may receive one or more commands to position the strobe reflector 100 into a particular configuration. For example, the network interface 24 may receive a command from the fire alarm control panel 14 to configure the strobe reflector into a full hemisphere configuration. The controller 26 of the strobe device 30 may receive the command, and in turn send a command to the one or more motors to move the support structure in order to shape the reflective material into a full hemisphere configuration. The strobe device 30 may also receive one or more commands to provide a status of the current position the strobe reflector 100. For example, the network interface 24 may receive a command from the fire alarm control panel 14 to provide a current configuration of the reflective material. The controller 26 of the strobe device 30 may receive the command, and in turn poll the one or more position sensors to determine the current configuration of the reflective material. The controller 26 may then send a response to the fire alarm control panel 14 via the network interface providing the current configuration.

Also, the strobe device 30 may receive one or more commands to report the current position of the strobe reflector 100. For example, the network interface 24 may receive a command from the fire alarm control panel 14 to provide the current position of the strobe reflector, such as whether the strobe reflector is in a full hemisphere configuration. The controller 26 of the strobe device 30 may receive the command, and in turn poll the one or more position sensors to determine the current configuration of the reflective material. The controller 26 may then send a response to the fire alarm control panel 14 via the network interface providing the current configuration.

While the invention has been described with reference to various embodiments, it should be understood that many changes and modifications can be made without departing from the scope of the invention. It is therefore intended that the foregoing detailed description be regarded as illustrative rather than limiting, and that it be understood that it is the following claims, including all equivalents, that are intended to define the spirit and scope of this invention.

The invention claimed is:

1. A reflector assembly for an alarm system notification device including a strobe, the reflector assembly comprising:
   a reflective material; and
   a support structure configured to support the reflective material and comprising a first structure and a second structure;
   wherein the first structure is configured for movement into a first position and a second position and is independently movable with respect to the second structure;
   wherein in the first position, at least a part of the reflective material is facing the strobe and configured to reflect light from the strobe; and
   wherein in the second position, the at least a part of the reflective material is connected to the support structure, is bent, is not facing the strobe and configured not to reflect light from the strobe.

2. The reflector assembly of claim 1,
   wherein the first structure is adjacent to the second structure; and
   wherein the second structure is not configured to move so that the second structure is stationary relative to the strobe.

3. The reflector assembly of claim 1, wherein the support structure further comprises a stationary structure relative to the strobe, the first structure and second structure configured to move independently of the stationary structure and to move independently of the strobe.

4. The reflector assembly of claim 3, wherein the stationary structure comprises a stationary skeletal structure.

5. The reflector assembly of claim 1, wherein the first structure comprises a telescoping structure configured to move at least a part of the reflective material in only a single degree of freedom relative to the strobe.

6. A reflector assembly for an alarm system notification device, the reflector assembly comprising:
   a reflective material; and
   a support structure configured to support the reflective material, the support structure configured to move to at least two distinct positions, a first position shaping the reflective material in a first configuration and a second position shaping the reflective material in a second configuration;
   wherein the support structure comprises at least a first structure and a second structure, the first structure being independently movable with respect to the second structure; and
   wherein the first structure is movable to the first position and to the second position;
   wherein the first structure includes an extended position and a retracted position;
   wherein the reflective material is connected to at least a part of the first structure;
   wherein, when the first structure is in the retracted position, at least a portion of the reflective material is connected to the support structure and is bent; and
   wherein, when the first structure is in the extended position, the at least a portion of the reflective material is not bent.

7. The reflector assembly of claim 1, wherein the first configuration comprises a half-hemisphere; and
   wherein the second configuration comprises a full-hemisphere.

8. The reflector assembly of claim 1, wherein the support structure comprises a facet shape support configured to support one or more facets in the reflective material.

9. The reflector assembly of claim 8, wherein the one or more facets in the first configuration is facing the strobe and in the second configuration is not facing the strobe.

10. A strobe device comprising:
    a network interface;
    a strobe;
    a controller in communication with the network interface and the strobe, the controller configured to communicate with a fire alarm panel via the network interface; and
    a reflector assembly comprising:
       a reflective material; and
       a support structure configured to support the reflective material and comprising a first structure and a second structure,
    wherein the first structure is configured for movement into a first position and a second position and is independently movable with respect to the second structure;
    wherein in the first position, at least a part of the reflective material is facing the strobe and configured to reflect light from the strobe; and
    wherein in the second position, the at least a part of the reflective material is connected to the support structure, is bent, is not facing the strobe and configured not to reflect light from the strobe.

11. The strobe device of claim 10, wherein the support structure further comprises a stationary structure relative to the strobe, the first structure and second structure configured to move independently of the stationary structure and to move independently of the strobe.

12. The strobe device of claim 10, wherein the first structure includes an extended position and a retracted position;
    wherein the reflective material is connected to at least a part of the first structure;
    wherein, when the first structure is in the retracted position, the at least a part of the reflective material is bent; and
    wherein, when the first structure is in the extended position, the at least a part of the reflective material is not bent.

13. The strobe device of claim 10, wherein the support structure comprises a facet shape support configured to support one or more facets in the reflective material.

14. The strobe device of claim 13, wherein the one or more facets in the first configuration is facing the strobe and in the second configuration is not facing the strobe.

15. The reflector assembly of claim 5, wherein the first structure further comprises a skeletal structure movable relative to the strobe; and wherein the movable skeletal structure is configured to move in combination with the telescoping structure.

16. The reflector assembly of claim 15, wherein the reflective material is pliable;

wherein the pliable reflective material is attached to at least a part of the movable skeletal structure.

17. The reflector assembly of claim 1, wherein in the first position, a first length of the reflective material is configured to reflect light from the strobe, wherein in the second position, a second length of the reflective material is configured to reflect light from the strobe, and wherein the first length is different from the second length.

18. The reflector assembly of claim 6, wherein when the first structure is in the retracted position, the at least a portion of the reflective material is pleated so that the at least a portion of the reflective material does not reflect light from the strobe; and wherein, when the first structure is in the extended position, the at least a portion of the reflective material is not pleated so that the at least a portion of the reflective material is configured to reflect light from the strobe.

19. The reflector assembly of claim 6, wherein when the first structure is in the retracted position, the at least a portion of the reflective material is tucked so that the at least a portion of the reflective material does not reflect light from the strobe; and wherein, when the first structure is in the extended position, the at least a portion of the reflective material is not tucked so that the at least a portion of the reflective material is configured to reflect light from the strobe.

20. The reflector assembly of claim 6, wherein when the first structure is in the retracted position, the at least a portion of the reflective material does not reflect light from the strobe; and wherein, when the first structure is in the extended position, the at least a portion of the reflective material is configured to reflect light from the strobe.

21. The strobe device of claim 10, wherein the first structure is adjacent to the second structure; and wherein the second structure is not configured to move so that the second structure is stationary relative to the strobe.

22. The reflector assembly of claim 1, where the first structure comprises a telescoping structure.

* * * * *